United States Patent [19]
Ocampo

[11] Patent Number: 5,819,671
[45] Date of Patent: Oct. 13, 1998

[54] PORTABLE MODULAR POWER SYSTEM

[76] Inventor: Honesto C. Ocampo, 4621 Magolia Ave., Baltimore, Md. 21227

[21] Appl. No.: 716,699

[22] Filed: Sep. 4, 1996

[51] Int. Cl.[6] ................................................ A47B 57/00
[52] U.S. Cl. ................................ 108/64; 108/65; 108/19
[58] Field of Search ................................ 108/64, 65, 18, 108/115, 19

[56] References Cited

U.S. PATENT DOCUMENTS

| | | | |
|---|---|---|---|
| 2,508,627 | 5/1950 | Spiegel et al. | 108/19 |
| 2,596,663 | 5/1952 | Duffy | 108/64 |
| 3,760,744 | 9/1973 | Cruckshank | 108/64 |
| 4,150,630 | 4/1979 | Pokorny et al. | 108/64 |
| 5,140,973 | 8/1992 | Home | 108/64 |

*Primary Examiner*—Peter M. Cuomo
*Assistant Examiner*—Gerard A. Anderson
*Attorney, Agent, or Firm*—Law Offices of Royal W. Craig

[57] ABSTRACT

A portable collapsible wheeled modular telescoping power system and/or work table arrangements is provided with multi-oriented tool placement and fences, for safety purposes.

Each power system is provided with means for coupling to an adjacent power system so to obtain a modular power system. A system of wheels is attached to the modular telescoping power system for movement thereof. Each work table is provided with an extension surface optional table for extension thereof by a track arrangement coupled to its respective table.

4 Claims, 3 Drawing Sheets

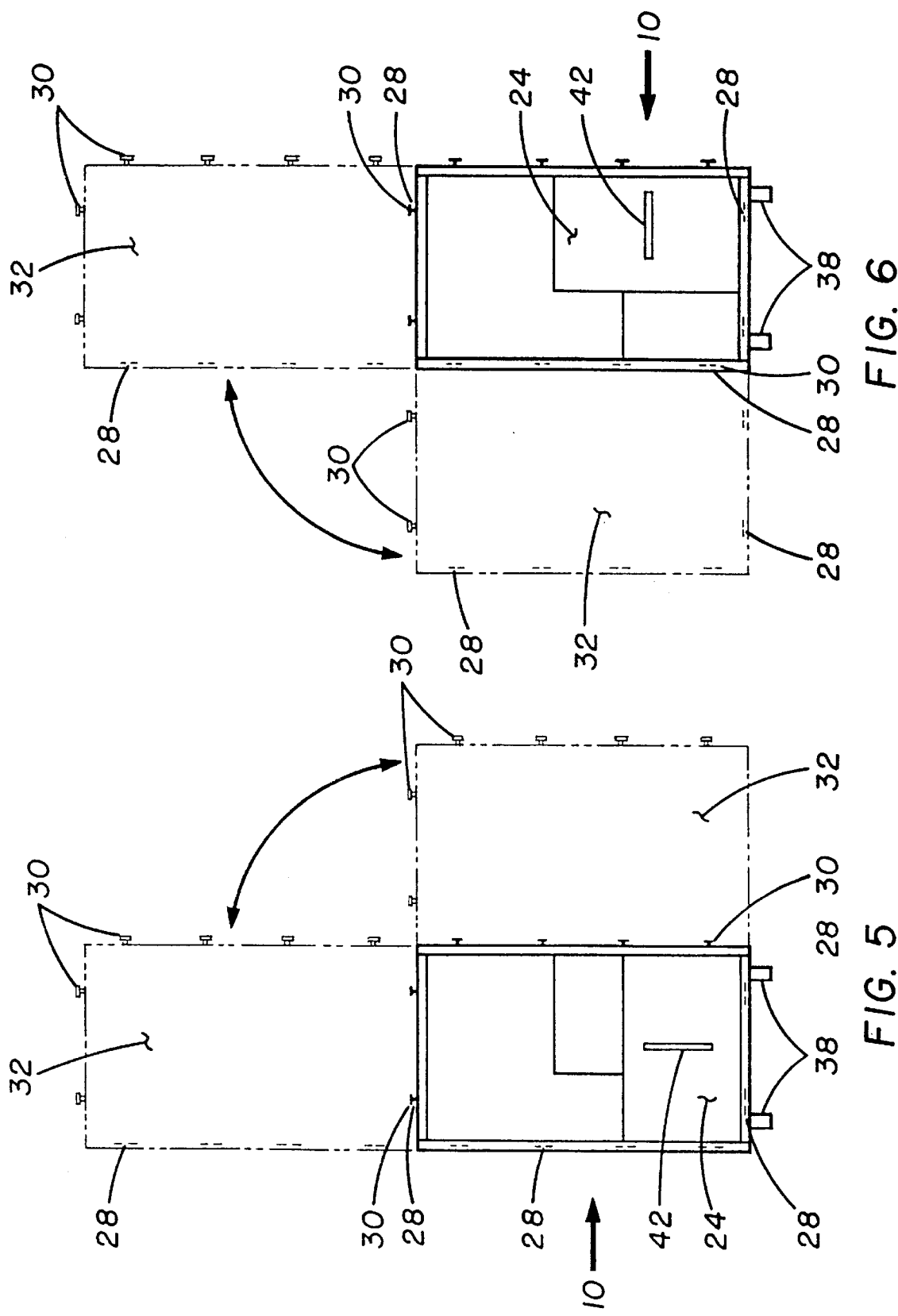

PORTABLE MODULAR POWER SYSTEM

FIELD OF THE INVENTION

This invention relates generally to power tools and attachments thereto, and more particularly to portable modular power systems for shaping of various types of materials for use in construction work.

PRIOR ART AND BACKGROUND TO THE INVENTION

More specifically, the main purpose of this invention is to improve the technology of using portable modular power type systems for the shaping and/or milling of various types of materials for use in construction work by milling sawing, planning, shaping and so forth, All of this is done by a portable modular power system having various removable attachments for obtaining modular capabilities and characteristics.

In the past, portable handheld and stationary power tools in respect to milling operations have been in practice for decades. The evolution in work stands and work it supports have become important due to safety, comfort, practical and economic considerations. New prior art includes collapsible, portable as well as wheeled power tool stands and work tables.

The best known prior U.S. art of the various arrangements is as follows:

| Name | Patent Number |
|---|---|
| H. J. Marcoux et al. | 3,342,226 |
| L. D. Kreitz | 4,068,551 |
| L. D. Kreitz | 4,106,381 |
| T. W. Hewitt | 4,640,326 |
| C. J. Eccardt | 4,677,920 |
| A. J. Bassett | 4,726,405 |
| A. R. Thomas | 4,887,653 |
| J. M. Rodrigues | 4,852,623 |
| T. Vacchiano | 4,860,807 |
| J. Withrow | 4,934,423 |
| J. Hughes | 4,964,450 |
| D. R. Romans | 4,969,496 |
| E. Blohm | 5,224,531 |
| S. Grochowicz | 5,363,893 |
| K. Brozell | 5,379,815 |
| R. Charlton | 5,379,816 |
| W. Searfoss | 5,462,102 |
| R. Biehe | 5,487,445 |

The above listed prior art patents show various types of portable power units for power saws, planers and other type of implements for milling, sawing, cutting of materials of various types and is considered as the best known prior art.

OBJECTS OF THE INVENTION

The principal object of this invention is to provide a portable, collapsible, wheeled modular telescoping power system and/or work table with multi-oriented tool placement and fence for safety purposes for milling, shaping, sawing of various types of materials.

Another of the principal object of this invention is to provide a portable modular power tool system that is lightweight and easily transported from one workstation of use to another workstation of use.

Another object of this invention is to provide a portable power tool system that has modular characteristics so that it can be added onto itself on any of its sides with optional arrangements attachable to each other so that a user thereof can keep adding on attachments to customize a planned layout work station.

Still another object of this invention is to provide a portable modular power system that has the capability to be extended lengthwise whenever a longer work surface is required by a user of the portable modular power tool system.

In addition, another object of this invention is to provide a portable modular power system that includes a table saw or like implement that can be rotated to give added versatility to suit various workstation setups.

A further object of this invention is to provide a portable modular power tool system which can be quickly setup, or broken down in a short amount of time without the use of any tools.

To provide a portable modular power tool system which when the system is in the breakdown position, serves at least two purposes, namely in a stowed position, upright and resting on its wheels and a safety bar; and in a portable position, can pivot from an upright position off of the safety bar down to a near horizontal position so that a user thereof can maneuver the portable modular power tool system through doorways, halls, elevators, and the like.

Still another object of this invention is to provide a portable modular power tool system wherein a safety mechanism is incorporated into the system so that it cannot collapse during operation, or whenever the breakdown of the portable modular power tool system is required so it can be transported or stored.

In addition, another object of this invention is to provide a fence which can be mounted on the extended table.

SUMMARY OF THE INVENTION

This invention is for a novel portable modular power system which is unlike the power implements of the prior art systems. The portable modular power system is lightweight and easily transported on a pair of wheels.

The system has modular characteristics so that it can be added onto itself on any of its sides. The optional work tables universally attach to each other so a user can keep adding on to customize a planned layout workstation.

The portable modular power system is also telescoping and extend lengthwise whenever a longer work surface is required and in which a fence can be mounted. The table saw (main tool) can be quickly rotated 90° to give added versatility to suit any workstation setup. The portable modular power tool unit can be quickly setup or brokendown without any tools.

The portable modular power system is easily set up and broken down. The breakdown position of the system serves two purposes: for storage the portable modular power system is positioned upright and rests on the two wheels and the safety bar; for transportation, the portable modular power system is pivoted from the upright position off the safety bar down to a near horizontal position, so a user can maneuver the system through doorways, halls, elevators, and the like. Safety is built in the modular system so the system cannot collapse during operation to, or whenever the breakdown of the system is required so it can be transported or stored.

BRIEF DESCRIPTION OF THE DRAWINGS

The nature and characteristic features of the invention will be more readily understood from the following description taken in connection with the accompanying drawings forming part hereof in which:

FIGS. 5 and 6 are top views showing a portable modular system setup variations and a table saw rotated.

DESCRIPTION OF THE PREFERRED EMBODIMENT

Figure 1:
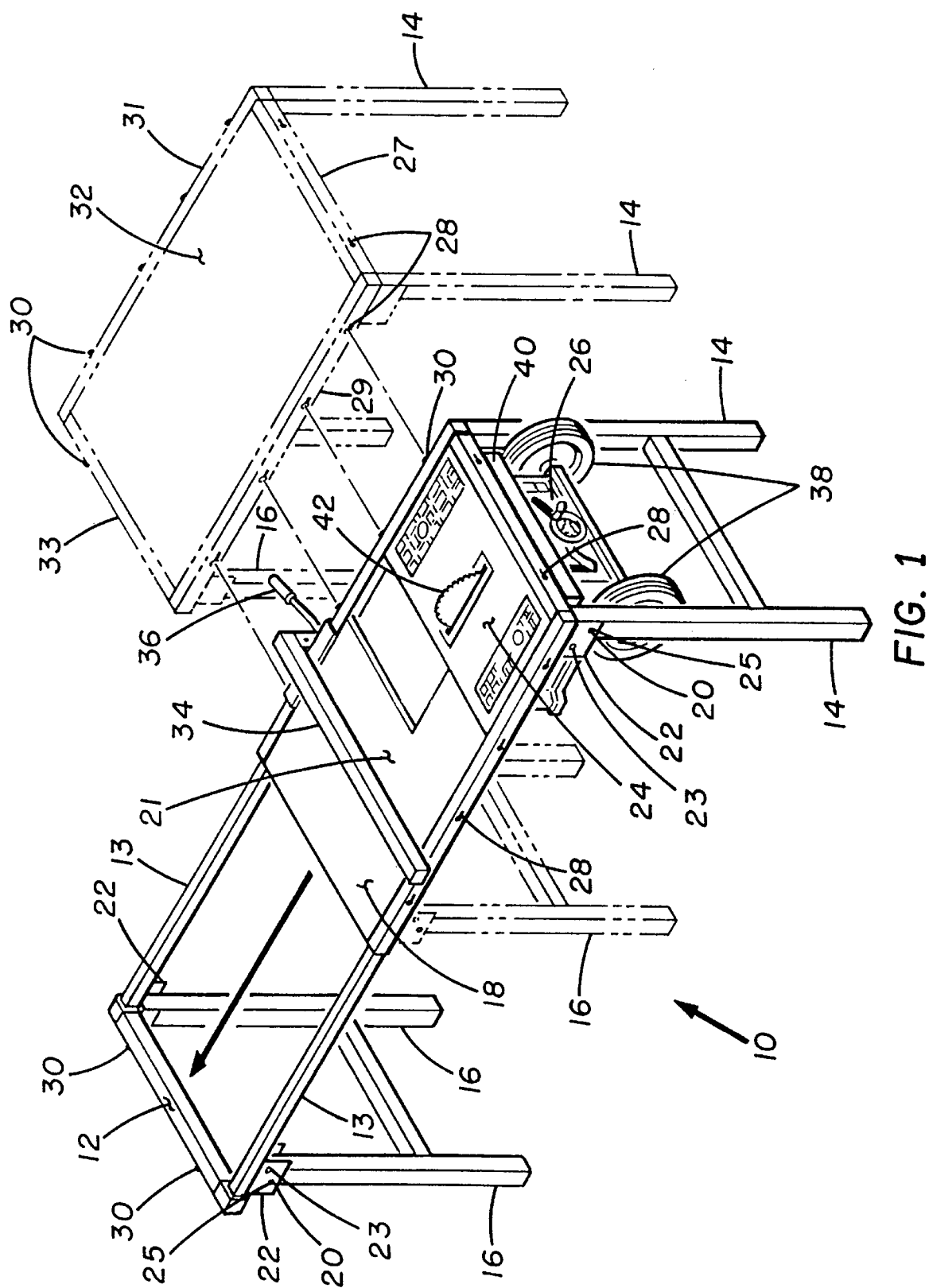
FIG. 1 is a perspective view of the portable modular power system with a table extended and an optional work table.

Referring now to the drawings, and particularly to FIG. 1, there is shown a portable modular power system 10 having a rear table extension 12. Also shown in FIG. 1 is a table 21 and an optional work table 32, with two sides 27 and 29 having slots 28 and two sides 31 and 33 having male studs 30 which universally engage with each side to form a wide array of combinations for any additional proposed workstations for the table 21 of the portable modular power system 10.

A table surface 18 and a table saw arrangement 24 having a table saw 42 form the top surface of table 21. The table saw 42 or like implement can be rotated 90° to add versatility for the setup requirements of a work station.

Also shown in FIG. 1, are table legs 14 and 16 for the table 21. These legs 14 and 16 are made to fold at a 90° angle whenever the table 21 requires setting up or breaking down. To set up locking pins 20 are depressed and released from first holes 23 at each side of brackets 22. The legs 14 and 16 then fold out and lock in place in second hole 25 of brackets 22. To breakdown, locking pins 20 are depressed and released from second holes 25 in the side of brackets 22. The legs 14 and 16 then fold in and lock in place in the first hole 23 of side brackets 22. Also shown in FIG. 1, are the saw controls 26 for power (ON-OFF) and the adjustment of the height on the table saw blade 42.

A fence 34 is employed and locked in place with a locking lever 36, as shown in FIG. 1. Two wheels 38, as shown in FIG. 1, are attached or coupled to the portable modular system 10 and are used to transport the portable modular power system 10. These wheels 38 support the modular power system 10 when in the stowed position along with a safety bar 40 which is utilized to stabilize the overall modular power system 10.

Also shown in FIG. 1 is the telescoping capability of the portable modular power system 10. The rear table extension 12 and the legs 16 can be extended out from the table as shown. The side rails 13 telescope out from sides 28 and 30. This rear table extension 12 can be used for additional work space, for resting materials or for an additional table top 21.

Figure 2:
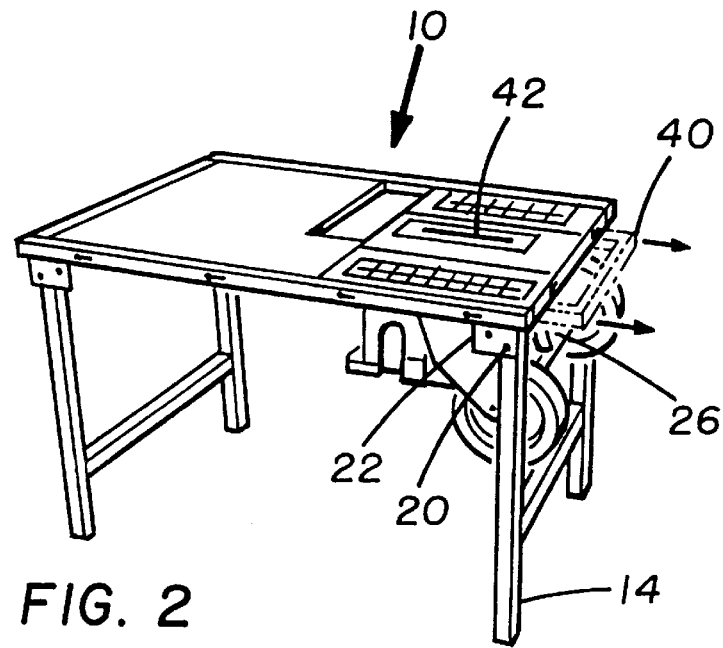
FIGS. 2, 3 and 4 are perspective views of the portable modular power system showing sequence of breakdown to a stowed position, or if pivoted down horizontally becomes a transporting position.
Figure 3:
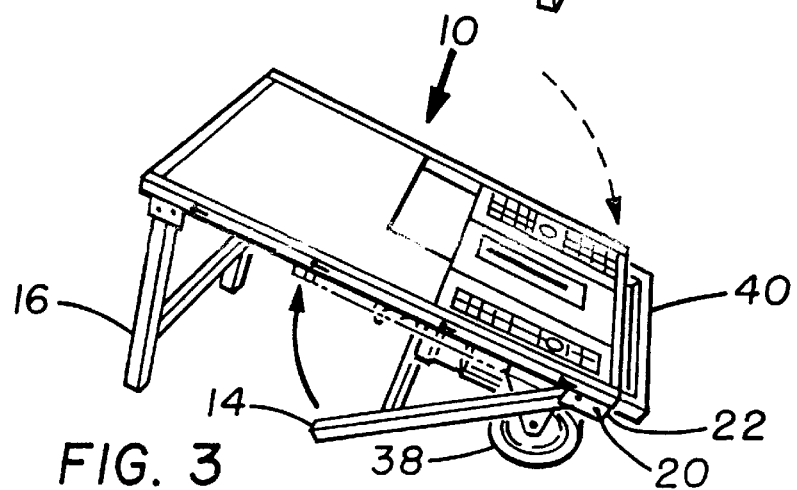
Figure 4:
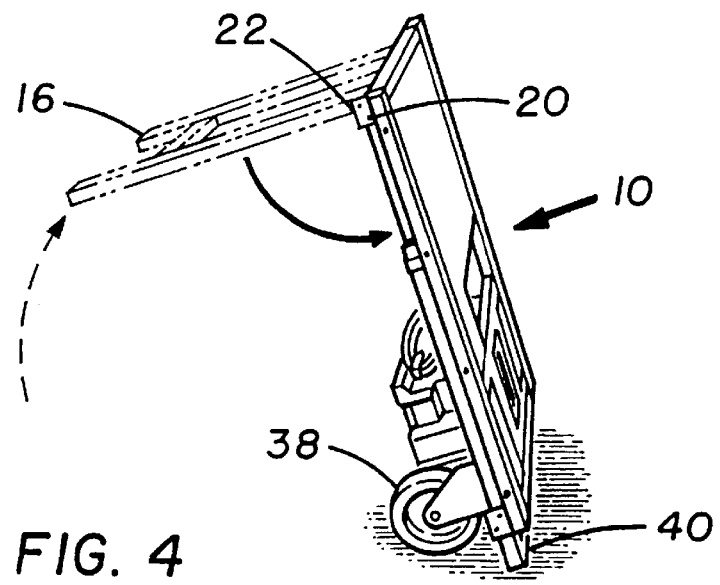

Referring now to FIGS. 2, 3 and 4, these figures illustrate how the portable modular power system 10 is broken down to its stowed position, or if pivoted downward to a near horizontal position to its transporting position. As shown in FIG. 2, the saw blade 42 must first be dropped down inside its slot so no bodily harm can result, with saw controls 26 being used to adjust it accordingly. Next, the safety bar 40 is pushed downwardly, then pulled outwardly to allow for breakdown of the modular power system 10. Using both hands, the locking pins 20 are then depressed at both sides of the brackets 22 and the front leg assembly 14 is pushed forwardly. The user's own leg will move the front leg assembly 14 inwardly enough to go on to the arrangement shown in FIG. 3.

Then the portable modular power system 10 is pulled downwardly until it rests on the floor on its wheels 38. The front leg assembly 14 is then lifted upwardly and inwardly until it is locked in place by the locking pins 20 (both sides).

In FIG. 4, the portable modular power system 10 is raised upwardly as shown with the safety bar 40 and the two wheels 38 fully supporting the overall modular power system 10. Using both hands, the locking pins 20 are depressed going through the brackets 22 (both sides) and at the same time the leg assembly 16 is pushed downwardly in towards the center of the table 21 until both sides of the modular power system 10 to lock in place by the use of the locking pins 20 (both sides). The complete the breakdown procedure is shown in FIGS. 2, 3 and 4.

When the portable modular power system 10 is to be transported, the top thereof is pivoted downwardly to near the horizontal position and the modular power system 10 is pulled or pushed as desired.

As seen in FIG. 5 and 6, there are top views showing variations of the modular power system 10. The optional work tables 32 are designed to fit into each other expanding in all four directions (multiples, etc) if required. FIG. 5 shows two variations of optional work positions. Table 32 has two sides having slots 28 typically and the other forming this modular setup. FIGS. 5 and 6 show how the table saw 42 and the saw blade 24 can be rotated together to make a more versatile setup of the modular power system 10 by the user, if needed.

The power modular power system 10 as designed herein makes for a wide range of setup combinations. The system is easy to transport and store. The ease on setup or breakdown of the system can be accomplished in a matter of seconds. This portable modular power system 10 can be changed for other tool requirements or it can be used implements other than a table saw 42 or the like.

Obviously many modifications and variations of the present invention are possible in light of the above teachings. It is, therefore, to be understood that the invention is meant to embrace all variations of the previously described structure as well as all equivalent apparatus that fall within the scope of the appended claims.

What is claimed is:

1. A portable modular power system for a work implement, comprising;

a plurality of implement supporting tables each having a plurality of collapsible legs for mounting and supporting the respective implement supporting tables;

an optional extension table corresponding to each of said implement supporting tables and including means for telescoping the optional extension table from said corresponding supporting table;

pivot means for pivotally attaching said collapsible legs to their respective implement supporting table, each of said collapsible legs being arranged to be stored in a position substantially parallel to said respective implement supporting table;

a pair of wheels coaxially and rotatably mounted on each of said implement supporting tables proximate a corresponding collapsible leg and adapted to support said implement supporting table when said legs are collapsed to provide for wheeled transport thereof; and means for coupling the respective implement supporting tables together to form modular power systems.

2. A portable power system as recited in claim 1, wherein said telescoping means includes a system of engaging tracks for allowing said optional table to move toward as well as away from said corresponding supporting table.

3. A portable modular power system for a work implement as recited in claim 1, further comprising track means for each implement supporting table, said extension table being arranged to allow said extension table to be extended lengthwise of said supporting table to form a large work surface.

4. A portable modular power system for a work implement as recited in claim 3, further comprising means for mounting an implement on each of said implement supporting tables.

* * * * *